United States Patent
Breese et al.

(10) Patent No.: US 8,086,720 B2
(45) Date of Patent: Dec. 27, 2011

(54) PERFORMANCE REPORTING IN A NETWORK ENVIRONMENT

(75) Inventors: Stephen S. Breese, Morrisville, NC (US); Stig Arne Olsson, Apex, NC (US); Geetha Vijayan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 2652 days.

(21) Appl. No.: 10/062,369

(22) Filed: Jan. 31, 2002

(65) Prior Publication Data
US 2003/0145080 A1    Jul. 31, 2003

(51) Int. Cl.
*G06F 15/16* (2006.01)
(52) U.S. Cl. ...................................... 709/224
(58) Field of Classification Search .................. 709/202, 709/203, 223–226, 228; 707/10; 714/48, 714/49, 25, 37, 47, 50; 370/252, 350; 719/317, 719/318
See application file for complete search history.

(56) References Cited

U.S. PATENT DOCUMENTS

| | | |
|---|---|---|
| 5,295,244 A | 3/1994 | Dev et al. |
| 5,459,837 A | 10/1995 | Caccavale |
| 5,504,921 A | 4/1996 | Dev et al. |
| 5,581,482 A | 12/1996 | Wiedenman et al. |
| 5,696,701 A | 12/1997 | Burgess et al. |
| 5,742,819 A | 4/1998 | Caccavale |
| 5,787,254 A | 7/1998 | Maddalozzo, Jr. et al. |
| 5,793,753 A * | 8/1998 | Hershey et al. ............... 370/252 |
| 5,812,780 A | 9/1998 | Chen et al. |
| 5,835,756 A | 11/1998 | Caccavale |
| 5,872,973 A | 2/1999 | Mitchell et al. |
| 5,944,782 A | 8/1999 | Noble et al. |
| 5,978,475 A * | 11/1999 | Schneier et al. ............... 713/177 |
| 6,000,045 A | 12/1999 | Lewis |

(Continued)

FOREIGN PATENT DOCUMENTS
AU    2001291148    4/2002

OTHER PUBLICATIONS

Chieng, David, et al. "Agent-Enhanced Dynamic Service Level Agreement in Future Network Environments," Lecture Notes in Computer Science, vol. 2216, Oct. 29-Nov. 1, 2001, pp. 299-312.*

(Continued)

*Primary Examiner* — Andrew Caldwell
*Assistant Examiner* — Melvin H Pollack
(74) *Attorney, Agent, or Firm* — Stephen J. Walder, Jr.; Mark C. Vallone (57) ABSTRACT

An example of a solution provided here comprises: collecting data from a plurality of probes, including at least one local probe and at least one remote probe; and reporting the data. For example, the reporting may comprise: reporting a first subset of the data that originated from a local probe; reporting a second subset of the data that originated from remote probes; and employing a similar reporting format for said first subset and said second subset. Thus comparison of data from a local probe and data from remote probes may be facilitated. Another example comprises: receiving data from at least one probe; comparing said data with at least one threshold value derived from a service level agreement; and outputting in a special mode any measured response time value that is greater than the corresponding threshold value. The following are provided: methods for performance reporting in a network environment, systems for executing such methods, and instructions on a computer-usable medium, for executing such methods.

50 Claims, 8 Drawing Sheets

U.S. PATENT DOCUMENTS

| | | | | |
|---|---|---|---|---|
| 6,041,349 | A | 3/2000 | Sugauchi et al. | |
| 6,041,352 | A | 3/2000 | Burdick et al. | |
| 6,052,733 | A | 4/2000 | Mahalingam et al. | |
| 6,055,493 | A | 4/2000 | Ries et al. | |
| 6,070,190 | A | 5/2000 | Reps et al. | |
| 6,078,956 | A | 6/2000 | Bryant et al. | |
| 6,092,113 | A | 7/2000 | Maeshima et al. | |
| 6,108,700 | A | 8/2000 | Maccabee et al. | |
| 6,112,236 | A | 8/2000 | Dollin et al. | |
| 6,141,699 | A | 10/2000 | Luzzi et al. | |
| 6,151,688 | A | 11/2000 | Wipfel et al. | |
| 6,163,775 | A * | 12/2000 | Wlaschin et al. | 707/3 |
| 6,167,445 | A | 12/2000 | Gai et al. | |
| 6,175,832 | B1 | 1/2001 | Luzzi et al. | |
| 6,177,886 | B1 * | 1/2001 | Billington et al. | 340/934 |
| 6,182,125 | B1 | 1/2001 | Borella et al. | |
| 6,219,705 | B1 * | 4/2001 | Steinberger et al. | 709/224 |
| 6,243,396 | B1 * | 6/2001 | Somers | 370/469 |
| 6,260,070 | B1 | 7/2001 | Shah | |
| 6,269,330 | B1 * | 7/2001 | Cidon et al. | 714/43 |
| 6,278,694 | B1 * | 8/2001 | Wolf et al. | 370/253 |
| 6,278,966 | B1 | 8/2001 | Howard et al. | |
| 6,279,002 | B1 | 8/2001 | Lenz et al. | |
| 6,321,264 | B1 | 11/2001 | Fletcher et al. | |
| 6,327,550 | B1 * | 12/2001 | Vinberg et al. | 702/186 |
| 6,336,138 | B1 | 1/2002 | Caswell et al. | |
| 6,349,325 | B1 | 2/2002 | Newcombe et al. | |
| 6,351,771 | B1 | 2/2002 | Craddock et al. | |
| 6,356,205 | B1 * | 3/2002 | Salvo et al. | 340/853.3 |
| 6,397,359 | B1 * | 5/2002 | Chandra et al. | 714/712 |
| 6,401,119 | B1 | 6/2002 | Fuss et al. | |
| 6,418,467 | B1 | 7/2002 | Schweitzer et al. | |
| 6,425,006 | B1 | 7/2002 | Chari et al. | |
| 6,430,712 | B2 | 8/2002 | Lewis | |
| 6,442,615 | B1 | 8/2002 | Nordenstam et al. | |
| 6,449,739 | B1 | 9/2002 | Landan | |
| 6,457,143 | B1 | 9/2002 | Yue | |
| 6,499,117 | B1 | 12/2002 | Tanaka | |
| 6,505,244 | B1 | 1/2003 | Natarajan | |
| 6,510,463 | B1 * | 1/2003 | Farhat et al. | 709/224 |
| 6,529,475 | B1 | 3/2003 | Wan et al. | |
| 6,550,024 | B1 * | 4/2003 | Pagurek et al. | 714/47 |
| 6,553,568 | B1 | 4/2003 | Fijolek et al. | |
| 6,556,659 | B1 * | 4/2003 | Bowman-Amuah | 379/9.04 |
| 6,584,108 | B1 | 6/2003 | Chung et al. | |
| 6,587,878 | B1 | 7/2003 | Merriam | |
| 6,606,581 | B1 | 8/2003 | Nickerson et al. | |
| 6,654,803 | B1 | 11/2003 | Rochford et al. | |
| 6,662,235 | B1 | 12/2003 | Callis et al. | |
| 6,701,342 | B1 * | 3/2004 | Bartz et al. | 709/200 |
| 6,701,363 | B1 | 3/2004 | Chiu et al. | |
| 6,708,137 | B2 | 3/2004 | Carley | |
| 6,732,168 | B1 * | 5/2004 | Bearden et al. | 709/223 |
| 6,734,878 | B1 | 5/2004 | DeLuca et al. | |
| 6,738,933 | B2 * | 5/2004 | Fraenkel et al. | 714/47 |
| 6,745,235 | B2 | 6/2004 | Baca et al. | |
| 6,751,661 | B1 | 6/2004 | Geddes | |
| 6,751,662 | B1 | 6/2004 | Natarajan et al. | |
| 6,757,543 | B2 * | 6/2004 | Moran et al. | 455/456.1 |
| 6,760,719 | B1 * | 7/2004 | Hanson et al. | 707/3 |
| 6,763,380 | B1 * | 7/2004 | Mayton et al. | 709/224 |
| 6,765,864 | B1 * | 7/2004 | Natarajan et al. | 370/224 |
| 6,766,278 | B2 | 7/2004 | Liu et al. | |
| 6,766,368 | B1 | 7/2004 | Jakobson et al. | |
| 6,779,032 | B1 | 8/2004 | Hericourt | |
| 6,789,050 | B1 | 9/2004 | Reeser et al. | |
| 6,792,455 | B1 * | 9/2004 | DeLuca et al. | 709/224 |
| 6,792,459 | B2 * | 9/2004 | Elnozahy et al. | 709/224 |
| 6,801,940 | B1 * | 10/2004 | Moran et al. | 709/224 |
| 6,807,156 | B1 * | 10/2004 | Veres et al. | 370/252 |
| 6,832,341 | B1 * | 12/2004 | Vijayan | 714/43 |
| 6,853,619 | B1 | 2/2005 | Grenot | |
| 6,857,020 | B1 * | 2/2005 | Chaar et al. | 709/223 |
| 6,859,831 | B1 * | 2/2005 | Gelvin et al. | 709/224 |
| 6,868,094 | B1 * | 3/2005 | Bordonaro et al. | 370/516 |
| 6,871,324 | B2 * | 3/2005 | Hand et al. | 715/734 |
| 6,885,302 | B2 | 4/2005 | Seal et al. | |
| 6,889,222 | B1 * | 5/2005 | Zhao | 707/3 |
| 6,892,235 | B1 | 5/2005 | Daude et al. | |
| 6,901,442 | B1 * | 5/2005 | Schwaller et al. | 709/224 |
| 6,904,458 | B1 * | 6/2005 | Bishop et al. | 709/223 |
| 6,928,471 | B2 * | 8/2005 | Pabari et al. | 709/223 |
| 6,934,745 | B2 * | 8/2005 | Krautkremer | 709/223 |
| 6,941,358 | B1 * | 9/2005 | Joiner et al. | 709/220 |
| 6,944,673 | B2 * | 9/2005 | Malan et al. | 709/237 |
| 6,944,798 | B2 | 9/2005 | Stephenson et al. | |
| 6,950,868 | B1 * | 9/2005 | Faraldo, II | 709/224 |
| 6,973,490 | B1 | 12/2005 | Robertson et al. | |
| 6,973,622 | B1 | 12/2005 | Rappaport et al. | |
| 6,983,321 | B2 | 1/2006 | Trinon et al. | |
| 6,990,433 | B1 | 1/2006 | McCutcheon | |
| 6,996,517 | B1 | 2/2006 | Papaefstathiou | |
| 7,019,753 | B2 | 3/2006 | Rappaport et al. | |
| 7,043,549 | B2 | 5/2006 | Breese et al. | |
| 7,047,291 | B2 | 5/2006 | Breese et al. | |
| 7,051,098 | B2 | 5/2006 | Masters et al. | |
| 7,231,606 | B2 | 6/2007 | Miller et al. | |
| 7,260,645 | B2 | 8/2007 | Bays et al. | |
| 7,269,651 | B2 | 9/2007 | Olsson et al. | |
| 7,363,368 | B2 * | 4/2008 | Paulin | 709/224 |
| 7,370,103 | B2 | 5/2008 | Hunt et al. | |
| 7,412,502 | B2 | 8/2008 | Fearn et al. | |
| 2002/0004828 | A1 | 1/2002 | Davis et al. | |
| 2002/0055999 | A1 | 5/2002 | Takeda | |
| 2002/0073195 | A1 | 6/2002 | Hellerstein et al. | |
| 2002/0087882 | A1 | 7/2002 | Schneier et al. | |
| 2002/0097267 | A1 | 7/2002 | Dinan et al. | |
| 2002/0099818 | A1 | 7/2002 | Russell et al. | |
| 2002/0138571 | A1 | 9/2002 | Trinon et al. | |
| 2002/0161875 | A1 | 10/2002 | Raymond | |
| 2003/0018450 | A1 | 1/2003 | Carley | |
| 2003/0061232 | A1 | 3/2003 | Patterson | |
| 2003/0093460 | A1 | 5/2003 | Kinney et al. | |
| 2003/0120762 | A1 * | 6/2003 | Yepishin et al. | 709/223 |
| 2003/0145079 | A1 * | 7/2003 | Breese et al. | 709/224 |
| 2003/0145080 | A1 | 7/2003 | Breese et al. | |
| 2003/0167406 | A1 | 9/2003 | Beavers | |
| 2003/0191837 | A1 | 10/2003 | Chen | |
| 2003/0221000 | A1 | 11/2003 | Cherkasova et al. | |
| 2004/0015846 | A1 * | 1/2004 | Haisraeli | 717/115 |
| 2004/0064546 | A1 | 4/2004 | Olsson et al. | |
| 2004/0078684 | A1 | 4/2004 | Friedman et al. | |
| 2004/0176992 | A1 | 9/2004 | Santos et al. | |
| 2004/0205100 | A1 | 10/2004 | Olsson et al. | |
| 2004/0205184 | A1 | 10/2004 | Olsson et al. | |
| 2006/0031469 | A1 | 2/2006 | Clarke et al. | |
| 2008/0052141 | A1 | 2/2008 | Olsson et al. | |
| 2008/0216095 | A1 | 9/2008 | Fearn et al. | |

OTHER PUBLICATIONS

Bhoj, Preeti et al. "SLA Management in Federated Environments," HP Internet Systems and Applications Laboratory, Dec. 1998, pp. 1-12.*

Fankhauser, George et al. "Service Level Agreement Trading for the Differentiated Services Architecture," Swiss Federal Institute of Technology, Computer Engineering and Networks Lab, Technical Report No. 59. Nov. 1999, pp. 1-17.*

Liu, Zhen et al. "On Maximizing Service-Level-Agreement Profits," ACM Conference on Electronic Commerce, Oct. 14-17, 2001, pp. 213-223.*

Gaidioz et al., "Synchronizing Network Probes to avoid Measurement Intrusiveness with the Network Weather Service", 2000, www.cs.utk.edu/~rich/publications/nws-period.ps.gz, pp. 1-9.

Clark et al., "Application-Level Measurements of Performance on the vBNS", 1999, www.cs.unc.edu/~jeffay/papers/ICMCS-99.ps, 5 pages.

Sekar et al., "A High-Performance Network Intrusion Detection System", 1999, www.seclab.cs.sunysb.edu/sekar/papers/ccs99.ps, 10 pages.

Adiseshu et al., "A State Management Protocol for IntServ, DiffServ, and Label Switching", 1998, www.ccrc.wustl.edu/~hari/icnp.ps, pp. 1-24.

Mercury Interactive Corporation, "Products and Services/Testing," web page available at www.mercuryinteractive.com, 2001.

Mercury Interactive Corporation, "Load Testing Monitors," web page available at www.mercuryinteractive.com, 2001.

Mercury Interactive Corporation, "QuickTest Professional," data sheet available at www.mercuryinteractive.com, 2001.

Atesto Technologies Inc, "How does FunctionChecker work?" web page available at http://www.atesto.com/solutions_func_test_how_it_works.asp, 2001.

Atesto Technologies Inc, "Functional and Regression Testing," web page available at http://www.atesto.com/solutions_automated_fun_test.asp., 2001.

Freshwater Software, "SiteSeer Example Reports," http://www.freshwatersoftware.com/SiteSeerReports.htm, 2001.

Reading Management Reports, web page available at http://demo.freshwater.com/SiteScope/docs/History.htm, 2001.

Holistix, "Holistix Web Manager," web page available at http://www.holistix.net/products/webmgr/ . 2001.

Holistix, "Holistix Web Manager Reporting," web page available at http://www.holistix.net/products/webmgr/reporting.html, 2001.

Holistix, Response time and performance thresholds, web page available at http://www.holistix.net/products/webmgr/url_response_time_chart.html, 2001.

Holistix, "Correlating response time to site availability," web page available at http://www.holistix.net/products/webmgr/avail_by_monitor.html., 2001.

Keynote, "Test Perspective," web page available at http://www.keynote.com/solutions/html/test_works.html., 2001.

Keynote, "The Keynote Solution," web page available at http://www.keynote.com/solutions/html/resource_transaction_perspecti.html., 2001.

Tweney, "The Need for Speed," *Business 2.0*, vol. 2, No. 7, Aug./Sep. 2001, pp. 144-145.

Vigna, "NetSTAT: A Network-based Intrusion Detection Approach", 1998, www.cs.ucsb.edu/~vigna/pub/vigna_kemmerer_acsac98,ps.gz, 10 pages.

Kung et al., "TCP Trunking for Bandwidth Management of Aggregate Traffic", 2000, www.eecs.harvard.edu/~htk/publication/2000-kung-wang-tcp-trunking-1100.pdf, pp. 1-12.

Parulkar, "An Architecture for Monitoring, Visualization and Control of Gigabit Networks", 1997, www.cs.wustl.edu/~schmidt/PDF/NMVC.pdf, pp. 1-21.

Paxson et al., "An Architecture for Large-Scale Internet Measurement", 1998, ftp.ee.lbl.gov/papers/nimi-ieee-comm98.ps.gz, pp. 1-9.

Phillips et al., "The FERET Evaluation Methodology for Face-Recognition Algorithms", 1999, sequoyah.ncsl.nist.gov/pub/nist_internal_reports/ir_6264.ps.Z, pp. 1-20.

Ruspini et al., "The Haptic Display of Complex Graphical Environments", 1997, robotics.stanford.edu/people/krasi/Siggraph97.ps.Z, 8 pages.

Blott et al., "User-Level Billing and Accounting in IP Networks", 1999, www.bell-labs.com/user/blott/BLTJ00.pdf, pp. 1-15.

Dykes et al., "An Empirical Evaluation of Client-side Server Selection Algorithms", 2000, www.ieee-infocom.org/2000/papers/700.pdf, 10 pages.

Kerbyson et al., "Modelling the performance of large-scale systems", IEE Proceedings-Software, vol. 150, No. 4, Aug. 2003, pp. 214-221.

Craswell, Nick et al., "Which search engine is best at finding airline site home pages?", MCIS Technical Report 01/45, Mar. 29, 2001, pp. 1-7.

Hahn, J. et al., "Measuring and Comparing the Effectiveness of E-Commerce Website Designs", 14th Workshop on Information Systems and Economics (WISE), 2002, 35 pages.

Liu, Bing et al., "Visualizing Web Site Comparisons", Proceedings of the 11th International Conference on World Wide Web, 2002, pp. 693-703.

Subraya, B.M. et al., "Object Driven Performance Testing of Web Applications", Proceedings of the First Asia-Pacific Conference on Quality Software, 2000, pp. 17-26.

Zhang, Ping et al., "Websites that Satisfy Users: A Theoretical Framework for Web User Interface Design and Evaluation", Proceedings of the 32nd Hawaii International Conference on System Sciences, 1999, pp. 1-8.

USPTO U.S. Appl. No. 10/062,329.
USPTO U.S. Appl. No. 10/122,001.
USPTO U.S. Appl. No. 10/125,619.
USPTO U.S. Appl. No. 10/256,094.
USPTO U.S. Appl. No. 10/383,847.
USPTO U.S. Appl. No. 10/383,853.
USPTO U.S. Appl. No. 10/880,275.
USPTO U.S. Appl. No. 11/855,247.
USPTO U.S. Appl. No. 12/102,357.

"Perceptual evaluation of speed quality (PESQ), an objective method for end-to-end speech quality assessment of narrowband telephone networks and speech codecs", International Telecommunications Union, Recommendation p. 862 (2001) (table of contents only) available at http://www.itu.int/rec/htmldoc.asp?doc=t%5Cp%5CT-REC-P.862-200102-I!!TOC-TXT-E.txt, 1 page. 2001 , 862.

"Voice Quality in IP Networks", Opticom Instruments, 2002, available from the web site of Opticom Instruments Inc., 3 pages.

"Voice Quality Testing for Wireless Networks", Opticom Instruments, 2001, available from the web site of Opticom Instruments Inc., 24 pages.

Larson, Michael "Probing Network Characteristics: a Distributed Network Performance Framework", Dr. Dobb's Journal, Jun. 2004, 6 pages.

Molta, Dave et al., "VoWLANs: Poised for Takeoff", Network Computing, available at www.nwc.com, Oct. 30, 2003, 12 pages.

Raisanen, Vilho "Quality of Service & Voice-Over-IP", Dr. Dobb's Journal, May 2001, 10 pages.

* cited by examiner

| | | 301 ↓ | 302 ↓ | 303 ↓ | 304 ↓ | 305 ↓ | 306 ↓ |
|---|---|---|---|---|---|---|---|
| 321 → | | Time | Probe | Open URL | Select Logon | Logon | Warranty and Service Info1 |
| 322 → | | | | | | | |
| 323 → | | Threshold (seconds) | | 7 | 6 | 11 | 7.2 |
| | | 23:58:17 | Washington, DC Exodus | 4.906 | 1.953 | 29.609 | 0.281 |
| | | 23:57:29 | Boston, MA Exodus | 5.109 | 1.375 | 21.515 | 0.265 |
| | | 23:52:34 | Frankfurt, DE UUNET | 5.938 | 2.243 | 23.904 | 0.33 |
| | | 23:52:19 | Dallas, TX Qwest | 82.078 | 2.484 | 26.015 | 0.296 |
| | | 23:51:44 | Madrid, Spain UUNET | 5.687 | 2.593 | 27.781 | 0.375 |
| | | 23:51:05 | Boston, MA UUNET | 5.39 | 2.093 | 22.453 | 0.281 |
| | | 23:49:54 | Washington, DC AT&T | 5.062 | 2.187 | 22.625 | 0.281 |
| | | 23:49:45 | Boston, MA Qwest | 12.109 | 2.281 | 24.796 | 0.296 |
| | | 23:45:17 | Chicago, IL UUNET | 5.875 | 2.187 | 22.265 | 0.312 |
| | | 23:45:09 | Frankfurt, DE GTS | 6.406 | 2.625 | 35.484 | 0.39 |
| | | 23:41:24 | Chicago, IL Exodus | 7.125 | 2.14 | 23.296 | 0.281 |
| | | 23:39:59 | London, UK Exodus | 5.515 | 2.375 | 24.125 | 0.328 |

| | 307 | 308 | 309 | 310 | 311 | 312 | 313 |
|---|---|---|---|---|---|---|---|
| | Entitlement lookup | Search Warranty | Warranty and Service Info2 | Service Support Guide | Support Home Page | Total | Availability |
| | 7.2 | 18 | 7.2 | 7.2 | 7.2 | | |
| | 2.265 | 11.312 | 0.437 | 0.781 | 23.171 | 74.715 | |
| | 2.078 | 11.796 | 0.687 | 0.781 | 16.968 | 61.074 | |
| | 2.113 | 12.708 | 0.901 | 0.841 | 18.827 | 67.805 | |
| | 2.312 | 11.656 | 1.031 | 0.921 | 20.171 | 146.964 | |
| | 2.484 | 11.734 | 1 | 0.89 | 25.234 | 77.778 | |
| | 1.984 | 13.156 | 0.671 | 0.906 | 17.25 | 64.184 | |
| | 2.265 | 12.265 | 0.609 | 0.796 | 17.421 | 63.511 | |
| | 2.156 | 12.312 | 0.796 | 0.312 | 23.125 | 78.683 | |
| | 2.015 | 13.703 | 0.843 | 0.828 | 18.125 | 66.153 | |
| | 2.468 | 12.14 | 1.125 | 0.89 | 25.687 | 87.215 | |
| | 2.203 | 12.453 | 0.796 | 0.812 | 18.515 | 67.621 | |
| | 2.125 | 12.125 | 1 | 0.843 | 18.359 | 66.795 | |

FIG. 3B

| | 401 | 402 | 403 | 404 | 405 | 406 |
|---|---|---|---|---|---|---|
| 421 → | Time (GMT) | Probe | Open URL | Select Logon | Logon | Warranty and Service Info |
| 422 → | Threshold (seconds) | | 7 | 6 | 11 | 7.2 |
| 423 → | 23:58:02 | Raleigh | 2.19 | 1.37 | 2.84 | 0.36 |
| | 23:38:00 | Raleigh | 2.97 | 1.26 | 4.47 | 0.35 |
| | 23:18:03 | Raleigh | 2.81 | 1.25 | 4.33 | 0.35 |
| | 22:58:10 | Raleigh | 2.26 | 1.36 | 7.91 | 0.36 |
| | 22:38:07 | Raleigh | 3.43 | 1.32 | 3.61 | 0.35 |
| | 22:15:31 | Raleigh | 2.60 | 1.37 | 8.19 | 0.35 |
| | 21:53:53 | Raleigh | 2.80 | 1.25 | 5.07 | 0.36 |
| | 21:33:53 | Raleigh | 2.29 | 1.25 | 6.31 | 0.35 |
| | 21:13:57 | Raleigh | 2.67 | 1.36 | 3.52 | 0.35 |
| | 20:54:01 | Raleigh | 6.22 | 1.26 | 3.38 | 0.37 |

FIG. 4A

| Entitlement lookup | Search Warranty | Warranty and Service Info | Service Support Guide | Support Home Page | Total | Availability to Query |
|---|---|---|---|---|---|---|
| 7.2 | 18 | 7.2 | 7.2 | 7.2 | | |
| 0.29 | 14.51 | 0.30 | 0.50 | 0.57 | 22.93 | |
| 0.48 | 12.49 | 0.30 | 0.50 | 0.57 | 23.39 | |
| 1.98 | 12.30 | 0.30 | 0.29 | 0.58 | 24.19 | |
| 2.16 | 12.29 | 0.30 | 0.29 | 0.60 | 27.53 | |
| 1.95 | 11.52 | 0.30 | 0.29 | 0.57 | 23.34 | |
| 1.79 | 12.70 | 0.30 | 0.50 | 0.58 | 28.38 | |
| 0.47 | 14.32 | 0.30 | 0.49 | 0.57 | 25.63 | |
| 0.49 | 11.90 | 0.30 | 0.29 | 0.57 | 23.75 | |
| 0.47 | 13.92 | 0.30 | 0.30 | 0.57 | 23.46 | |
| 1.59 | 12.73 | 0.30 | 0.31 | 0.58 | 26.74 | |

PERFORMANCE REPORTING IN A NETWORK ENVIRONMENT

CROSS-REFERENCES TO RELATED APPLICATIONS, AND COPYRIGHT NOTICE

The present application is related to a co-pending application entitled Method and System for Probing in a Network Environment, filed on even date herewith, assigned to the assignee of the present application, and herein incorporated by reference. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to information handling, and more particularly to methods and systems for evaluation of the performance of information handling in a network environment, and for reporting performance data.

BACKGROUND OF THE INVENTION

Various approaches have been proposed for monitoring, simulating, or testing web sites. Examples include U.S. Pat. No. 6,278,966 B1 (Howard, et al., Aug. 21, 2001), "Method and System for Emulating Web Site Traffic to Identify Web Site Usage Patterns." However, this example addresses substantially different problems (problems of simulation and hypothetical phenomena), and thus is significantly different from the present invention. Other examples include U.S. Pat. No. 6,078,956 (Bryant, et al., Jun. 20, 2000) and U.S. Pat. No. 5,787,254 (Maddalozzo, et al., Jul. 28, 1998). Other examples include services available from vendors such as Atesto Technologies Inc., Keynote Systems, and Mercury Interactive Corporation. These services may involve a script that runs on a probe computer. The examples mentioned above do not necessarily provide for some comparisons that are useful for problem-solving.

A wide variety of valuable services are provided through client-server applications, so proper performance of client-server applications may be very important. Lack of useful performance information can hamper problem-solving efforts for client-server applications. Thus there is a need for systems and methods that effectively communicate performance information regarding client-server applications, including but not limited to web sites.

SUMMARY OF THE INVENTION

An example of a solution to problems mentioned above comprises: collecting data from a plurality of probes, including at least one local probe and at least one remote probe; and reporting the data. For example, the reporting may comprise: reporting a first subset of the data that originates from a local probe; reporting a second subset of the data that originates from remote probes; and employing a similar reporting format for said first subset and said second subset. Thus comparison of data from a local probe and data from remote probes may be facilitated.

To give further examples of the solutions provided, there are solutions comprising: receiving data from at least one probe; comparing said data with at least one threshold value derived from a service level agreement; and reporting results of said comparing. Another example comprises: receiving data from at least one probe; comparing said data with at least one threshold value derived from a service level agreement; and outputting in a special mode any measured response time value that is greater than the corresponding threshold value.

BRIEF DESCRIPTION OF THE DRAWINGS

A better understanding of the present invention can be obtained when the following detailed description is considered in conjunction with the following drawings. The use of the same reference symbols in different drawings indicates similar or identical items.

DETAILED DESCRIPTION

The examples that follow involve the use of one or more computers and may involve the use of one or more communications networks. The present invention is not limited as to the type of computer on which it runs, and not limited as to the type of network used.

The following are definitions of terms used in the description of the present invention and in the claims:

"Availability" means ability to be accessed or used.

"Client-server application" means any application involving a client that utilizes a service, and a server that provides a service. Examples of such a service include but are not limited to: information services, transactional services, access to databases, and access to audio or video content.

"Comparing" means bringing together for the purpose of finding any likeness or difference, including a quantitative likeness or difference. "Comparing" may involve answering questions including but not limited to: "Is a measured response time greater than a threshold response time?" Or "Is a response time measured by a remote probe significantly greater than a response time measured by a local probe?"

"Computer-usable medium" means any kind of computer memory, such as floppy disks, hard disks, Random Access Memory (RAM), Read Only Memory (ROM), CD-ROM, flash ROM, non-volatile ROM, and non-volatile memory.

"Measuring" means evaluating or quantifying.

"Outputting" means producing, transmitting, or turning out in some manner, including but not limited to printing on paper, or displaying on a screen, or using an audio device.

"Performance" means execution or doing; "performance" may refer to any aspect of an application's operation, including availability, response time, time to complete batch processing or other aspects.

"Probe" means any computer used in evaluating, investigating, or quantifying performance; for example a "probe" may be a personal computer executing a script, acting as a client, and requesting services from a server.

"Response time" means elapsed time in responding to a request or signal.

"Script" means any program used in evaluating, investigating, or quantifying performance; for example a script may cause a computer to send requests or signals according to a transaction scenario. A script may be written in a scripting language such as Perl or some other programming language.

"Service level agreement" means any oral or written agreement between provider and user. For example, "service level agreement" includes but is not limited to an agreement between vendor and customer, and an agreement between an information technology department and an end user. For example, a "service level agreement" might involve one or more client-server applications, and might include specifications regarding availability, response times or problem-solving.

"Storing" data or information, using a computer, means placing the data or information, for any length of time, in any kind of computer memory, such as floppy disks, hard disks, Random Access Memory (RAM), Read Only Memory (ROM), CD-ROM, flash ROM, non-volatile ROM, and non-volatile memory.

"Threshold value" means any value used as a borderline, standard, or target; for example, a "threshold value" may be derived from a service level agreement, industry norms, or other sources.

Figure 1:
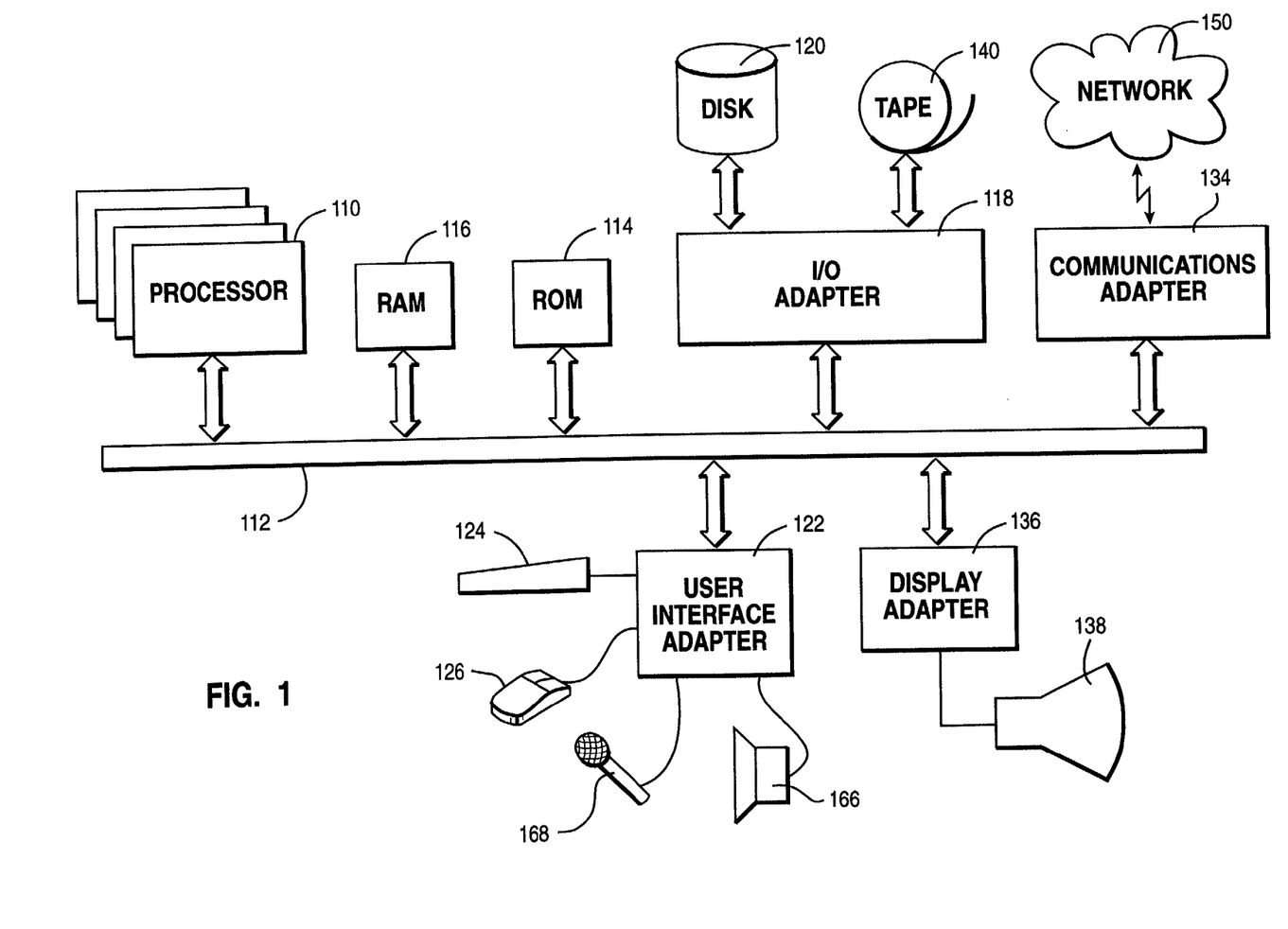
FIG. 1 illustrates a simplified example of a computer system capable of performing the present invention.

FIG. 1 illustrates a simplified example of an information handling system that may be used to practice the present invention. The invention may be implemented on a variety of hardware platforms, including personal computers, workstations, servers, and embedded systems. The computer system of FIG. 1 has at least one processor 110. Processor 110 is interconnected via system bus 112 to random access memory (RAM) 116, read only memory (ROM) 114, and input/output (I/O) adapter 118 for connecting peripheral devices such as disk unit 120 and tape drive 140 to bus 112. The system has user interface adapter 122 for connecting keyboard 124, mouse 126, or other user interface devices such as audio output device 166 and audio input device 168 to bus 112. The system has communication adapter 134 for connecting the information handling system to a data processing network 150, and display adapter 136 for connecting bus 112 to display device 138. Communication adapter 134 may link the system depicted in FIG. 1 with hundreds or even thousands of similar systems, or other devices, such as remote printers, remote servers, or remote storage units. The system depicted in FIG. 1 may be linked to both local area networks (sometimes referred to as Intranets) and wide area networks, such as the Internet.

While the computer system described in FIG. 1 is capable of executing the processes described herein, this computer system is simply one example of a computer system. Those skilled in the art will appreciate that many other computer system designs are capable of performing the processes described herein.

Figure 2:
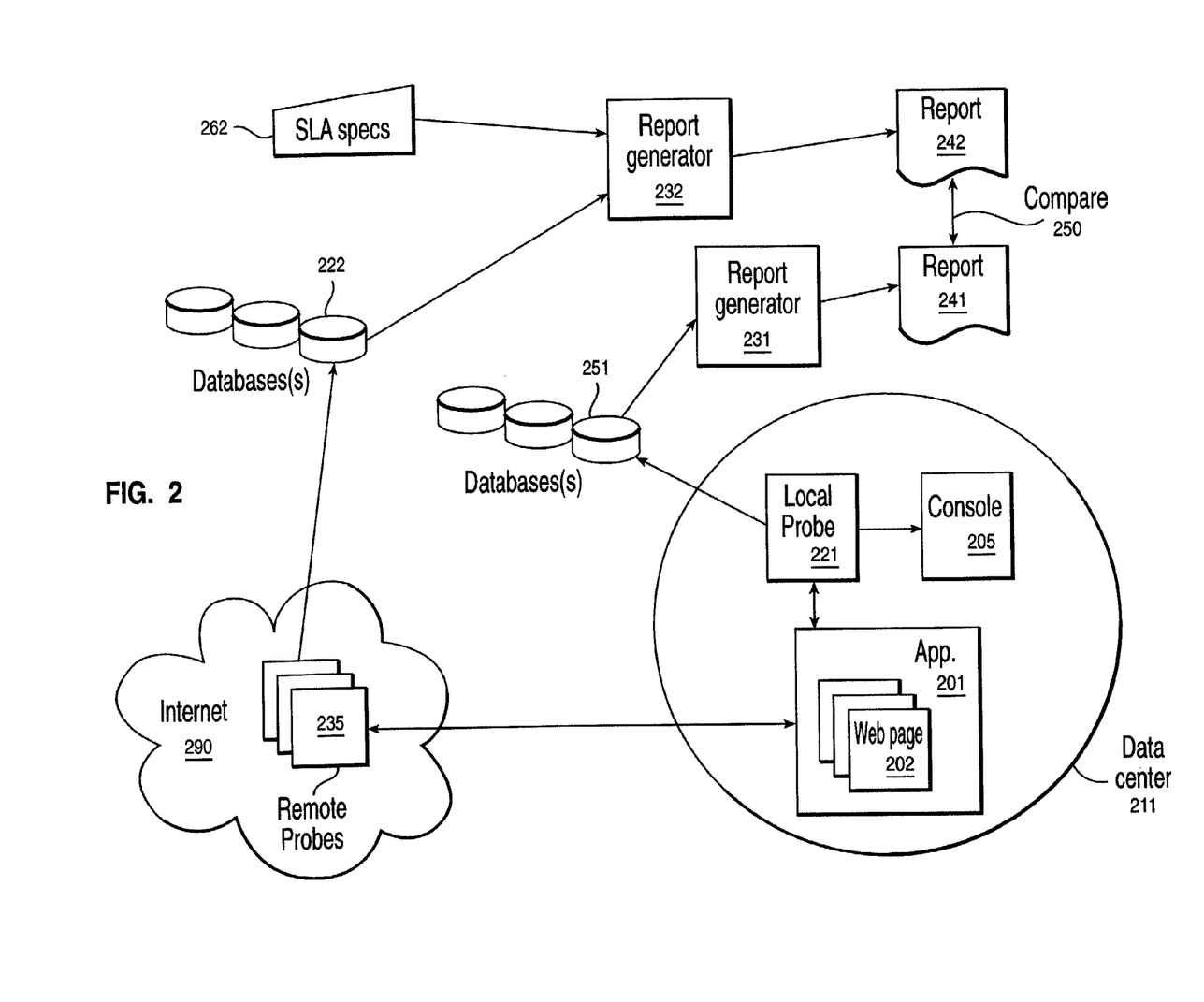
FIG. 2 is a block diagram illustrating one example of how the present invention was implemented for web site measurement.

FIG. 2 is a block diagram illustrating one example of how the present invention was implemented for web site measurement. As an overview, this example comprised: collecting data (in databases shown at 222 and 251) from a plurality of probes, including at least one local probe (shown at 221) and at least one remote probe (shown at 235); and reporting said data (reports shown at 241 and 242). The reporting further comprised: reporting a first subset (report shown at 241) of the data that originated from a local probe 221; reporting a second subset (report shown at 242) of the data that originated from remote probes 235; and employing a similar reporting format for said first subset and said second subset. Thus comparison of data from a local probe 221 and data from remote probes 235 was facilitated. The double-headed arrow at 250 symbolizes comparison. Such comparison proved to be useful for solving performance problems.

The same script was deployed on the local and remote probes. The local probe 221 provided information that excluded the Internet, while the remote probes 235 provided information that included the Internet (shown at 290). Thus, the information could be compared to determine whether performance or availability problems were a function of the site itself (infrastructure-specific or application-specific), or a function of the Internet 290.

Another aspect of this example was comparing data (e.g. data stored in database 222) with at least one threshold value derived from a service level agreement (symbolized by "SLA specs" at 262); and reporting results (e.g. in report 242) of said comparing.

Turning now to some details of the example implementation, probes measured response time for requests. The double-headed arrow connecting remote probes at 235 with application 201 symbolizes requests and responses. The double-headed arrow connecting local probe 221 with application 201 symbolizes requests and responses.

We located application probes locally at hosting sites (e.g. local probe shown at 221, within data center 211) and remotely at relevant end-user sites (remote probes at 235). This not only exercised the application code and application hosting site infrastructure, but also probed the ability of the application and network to deliver data from the application hosting site to the remote end-user sites. End-to-end measurement of IBM external applications (symbolized by application 201 with web pages 202) for customers or business partners, for example, involved remote application probes (RAP's) on the Internet (remote probes at 235 shown within Internet 290). While we measured the user availability and performance from a customer perspective (remote probes at 235), we also measured the availability and performance of the application at the location where it was deployed (local probe shown at 221, within data center 211). This provided baseline performance measurement data, that could be used for analyzing the performance measurements from the remote probes (at 235).

Local probe 221 was implemented with a personal computer, utilizing IBM's Enterprise Probe Platform technology, but other kinds of hardware and software could be used. A local probe 221 was placed on the IBM network just outside the firewall at the center where the web site was hosted. A local probe 221 was used to probe one specific site per probe. There could be multiple scripts per site. A local probe 221 executed the script every 20 minutes. Intervals of other lengths also could be used.

Another aspect of this example was providing an alert when data indicated an error. An example of an error is a measured response time value greater than a corresponding threshold value. For example, if a local probe 221 encountered a problem (e.g. it was unable to access the site or unable to complete the script) on two consecutive executions of the script, local probe 221 generated a real time alert (problem event), and sent it to a TIVOLI management system (shown as console 205). Another similar kind of management system could be used. Thus an alert was provided via a system management computer. An alert message via email also could be used.

Local probe 221 sent to a database 251 the data produced by the measuring process. Database 251 was implemented by using IBM's DB2 technology, but other database management software could be used, such as ORACLE, INFORMIX, SYBASE, MYSQL, Microsoft Corporation's SQL SERVER, or similar software. For local probe data, an automated reporting tool (shown as report generator 231) ran continuously at set intervals, obtained data from database 251, and sent reports 241 via email to these IBM entities: the web site owner, the hosting center, and IBM's world wide command center. Reports 241 also could be posted on a web site at the set intervals. Report generator 231 was implemented by using the Perl scripting language and the AIX operating system. However, some other programming language could be used, and another operating system could be used, such as LINUX, or another form of UNIX, or some version of Microsoft Corporation's WINDOWS, or some other operating system. Note that in an alternative example, report generator 231 might obtain data from databases at 251 and at 222, then generate reports 241 and 242.

Remote probes at 235 were implemented by contracting for probing services available from Mercury Interactive Corporation, but services from another vendor could be used, or remote probes could be implemented by other means (e.g. directly placing probes at various ISP's). A remote probe 235 may be used to probe one specific site per probe; a probe also has the capability of probing multiple sites. There could be multiple scripts per site. Remote probes 235 were located at various ISP's in parts of the world that the web site supported. A remote probe 235 executed the script every 60 minutes. Intervals of other lengths also could be used. If multiple remote probes at 235 are used, probe execution times may be staggered over the hour to ensure that the performance of the web site is being measured throughout the hour. Remote probes at 235 sent to a database 222 the data produced by the measuring process. Database 222 was implemented by using Mercury Interactive's database, but other database management software could be used, such as IBM's DB2, ORACLE, INFORMIX, SYBASE, MYSQL, Microsoft Corporation's SQL SERVER, or similar software. Report generator 232 was implemented by using Mercury Interactive's software and web site, but another automated reporting tool could be used, such as the one described above for local probe data (shown as report generator 231). IBM's arrangement with Mercury Interactive included the following: Mercury Interactive's software at 232 used IBM's specifications (symbolized by "SLA specs" at 262) and created near-real-time reports (symbolized by report 242) in a format required by IBM; IBM's specifications and format were protected by a confidential disclosure agreement; the reports at 242 were supplied in a secure manner via Mercury Interactive's web site at 232; access to the reports was restricted to IBM entities (the web site owner, the hosting center, and IBM's world wide command center).

Turning now to some details of collecting data from a plurality of probes, Component Probes measure availability, utilization and performance of infrastructure components, including servers, LAN, and services. Local component probes (LCPs) may be deployed locally in hosting sites, service delivery centers or data centers (e.g. at 211).

Network Probes measure network infrastructure response time and availability. Remote Network Probes (RNPs) may be deployed in a local hosting site or data center (e.g. at 211) if measuring the intranet or at Internet Service Provider (ISP) sites if measuring the Internet.

Application Probes measure availability and performance of applications and business processes.

Local Application Probe (LAP): Application probes deployed in a local hosting site or data center (e.g. at 211) are termed Local Application Probes.

Remote Application Probe (RAP): An application probe deployed from a remote location is termed a Remote Application Probe.

The concept of "probe" is a logical one. Thus, implementing a local component probe could actually consist of implementing multiple physical probes.

Providing a script for a probe would comprise defining a set of transactions that are frequently performed by end users. Employing a plurality of probes would comprise placing at least one remote probe (shown at 235 in FIG. 2) at each location having a relatively large population of end users. Note that the Remote Application Probe transactions and Local Application Probe transactions should be the same transactions. The example measured all the transactions locally (shown at 221), so that the local application response time can be compared to the remote application response time. (The double-headed arrow at 250 symbolizes comparison.) This can provide insight regarding application performance issues. End-to-end measurement of an organization's internal applications for internal customers will involve a RAP on an intranet, whereas end-to-end measurement of an organization's external applications for customers, business partners, suppliers, etc. will involve a RAP on the Internet (shown at 235). The example involved defining a representative transaction set, and deploying remote application probes at relevant end-user locations. (This simplicity is something that can only be appreciated when this example is contrasted with other more complicated models.) A benefit following from the simplicity of this example is that it is easily generalized to other environments besides web based applications. Application 201 may be any client-server application. Some examples are a web site, a web application, database management software, a customer relationship management system, an enterprise resource planning system, or an opportunity-management business process where a client directly connects to a server.

Figure 3A:
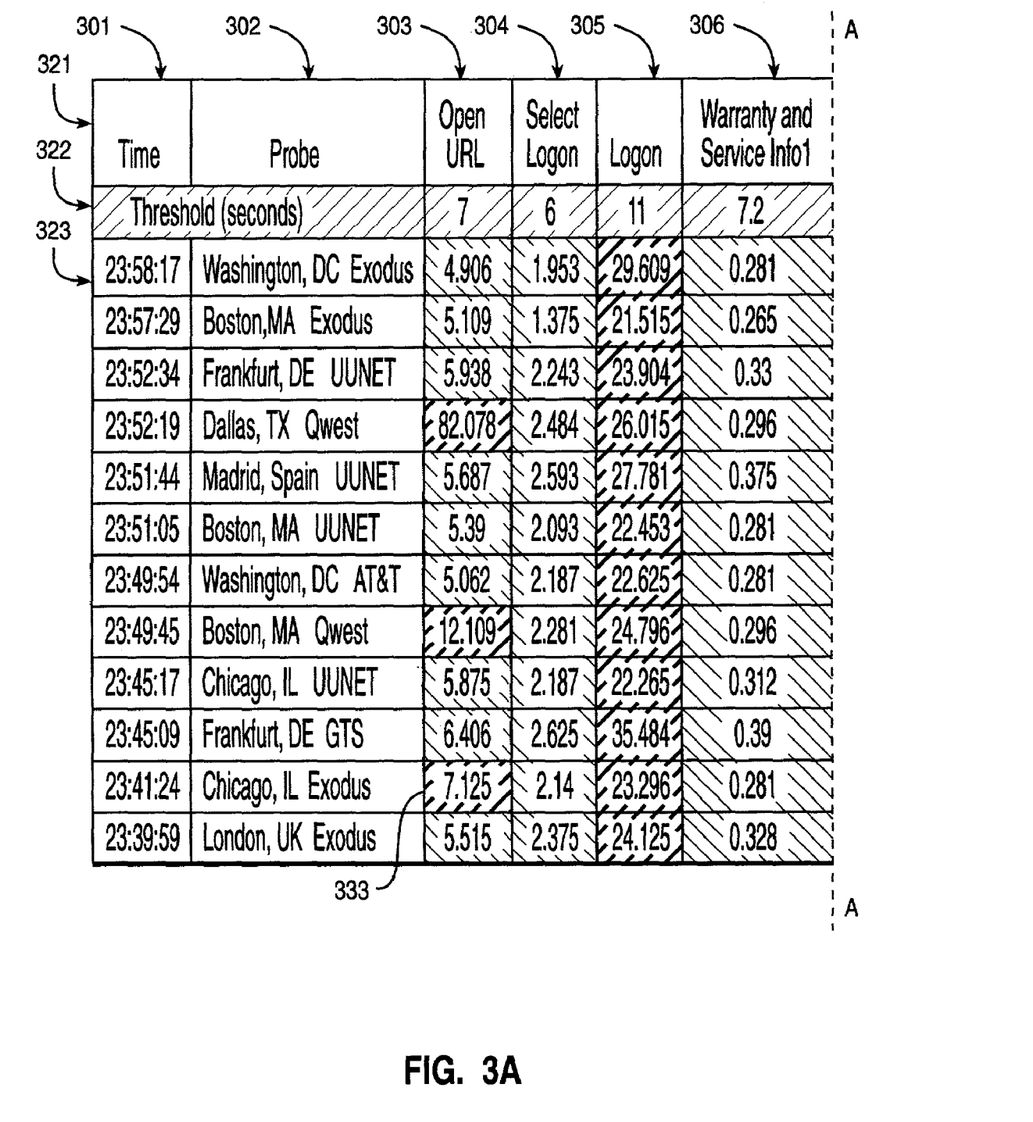
FIG. 3A and FIG. 3B illustrate an example of a report that was generated with data from remote probes.
Figure 3B:
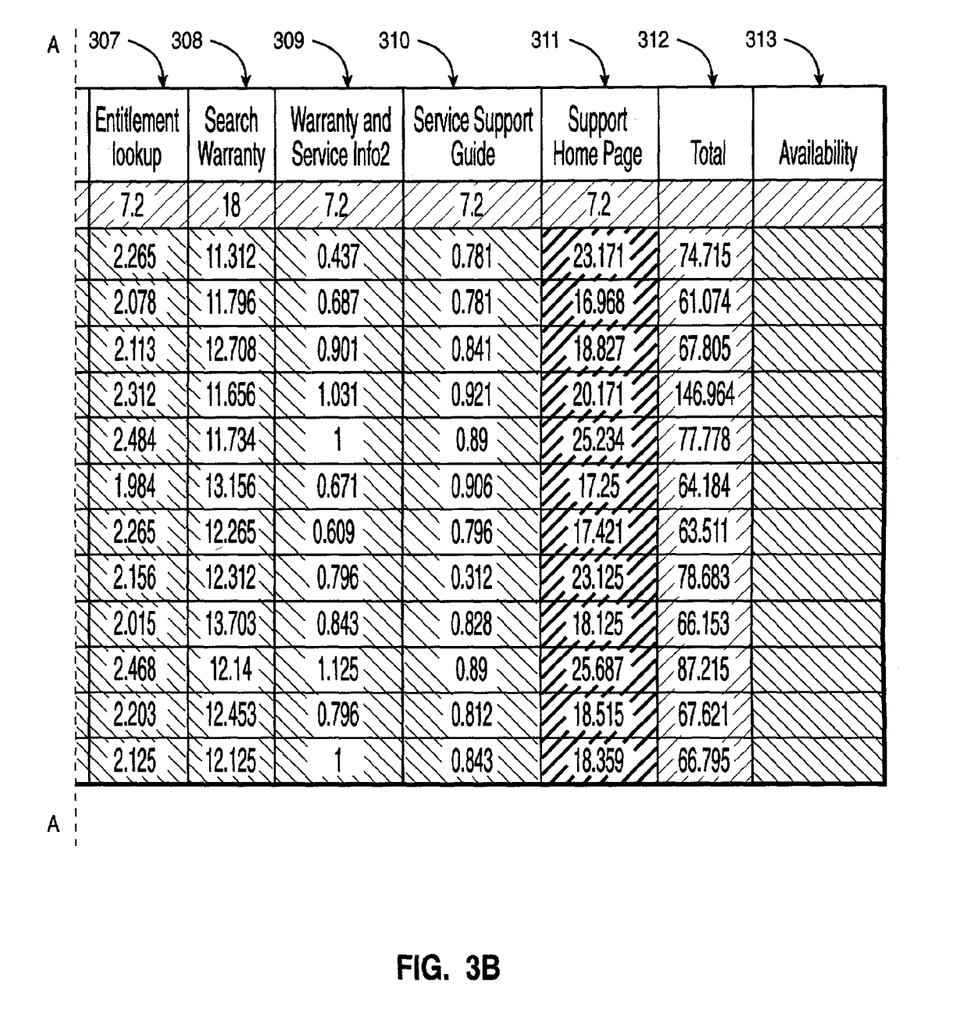

FIG. 3A and FIG. 3B illustrate an example of a report that was generated with data from remote probes. The data was produced by probing a web site that served an after-sales support function. The probes used a script representing a typical inquiry about a product warranty. Similar reports could be produced in connection with probing other kinds of web sites, or probing other kinds of client-server applications.

To begin with an overview, the broken line AA shows where the report is divided into two sheets. Columns 303-312 display response time data in seconds. Each of the columns 303-311 represent a transaction step in a script. Column 312 represents the total of the response times for all the transaction steps. A description of the transaction step is shown in the column heading in row 321. Column 313 displays availability information, using a color code. In one example, the cell in column 313 was green if all the transaction steps were completed; otherwise the cell was red, representing a failed attempt to execute all the transaction steps. Thus column 313 may provide a measure of end-to-end availability from a probe location, since a business process could cross multiple applications deployed in multiple hosting centers. Column 302 shows probe location and Internet service provider information. Column 301 shows time of script execution. Each row from row 323 downward represents one iteration of the script; each of these rows represents how one end user's execution of a business process would be handled by the web site. Cells with a special color display service level agreement violations; in this example, a special color is shown by darker shading, seen in the cells of column 311 for example. A report may contain error messages (not shown in this example).

Turning to some details of FIG. 3A and FIG. 3B, this example involves comparing data with threshold values derived from a service level agreement. To report the results of this comparing, color is used in this example. Row 322 shows threshold values. In each column, response times for a transaction step are compared with a corresponding threshold value. For example, column 303 is for the "open URL" step. For that step, column 303 reports results of each script execution by a plurality of probes. Reporting involves outputting in a special mode any measured response time value that is greater than the corresponding threshold value. Outputting in a special mode may mean outputting in a special color, for example, or outputting with some other visual cue such as highlighting or a special symbol. A special color is shown by darker shading, seen in the cell at 333 for example. In one implementation, the special color was red, and other cells were in green. In this example, hypertext markup language (HTML) was used to create the report, but another language such as extensible markup language (XML) could be used.

Figure 4A:
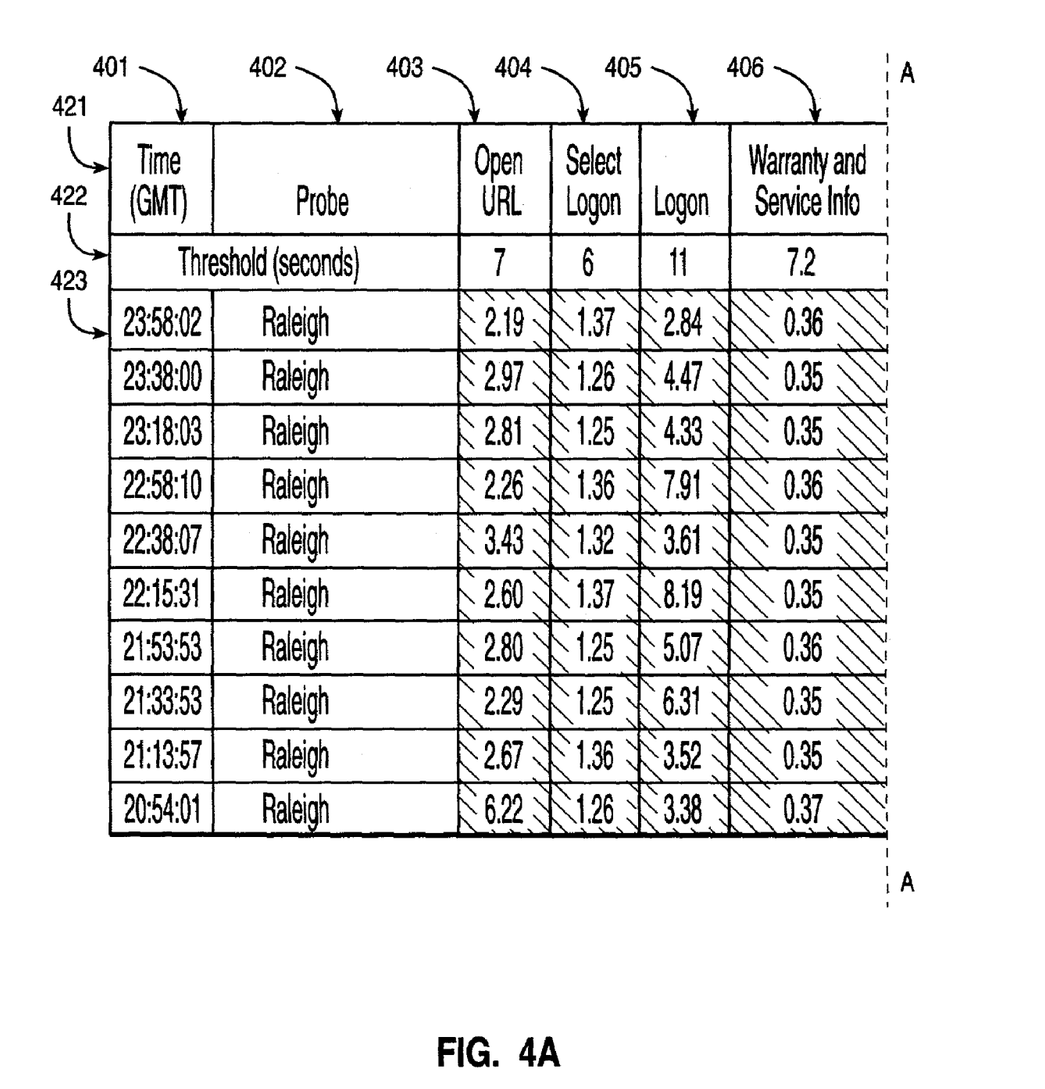
FIG. 4A and FIG. 4B illustrate an example of a report that was generated with data from a local probe.
Figure 4B:
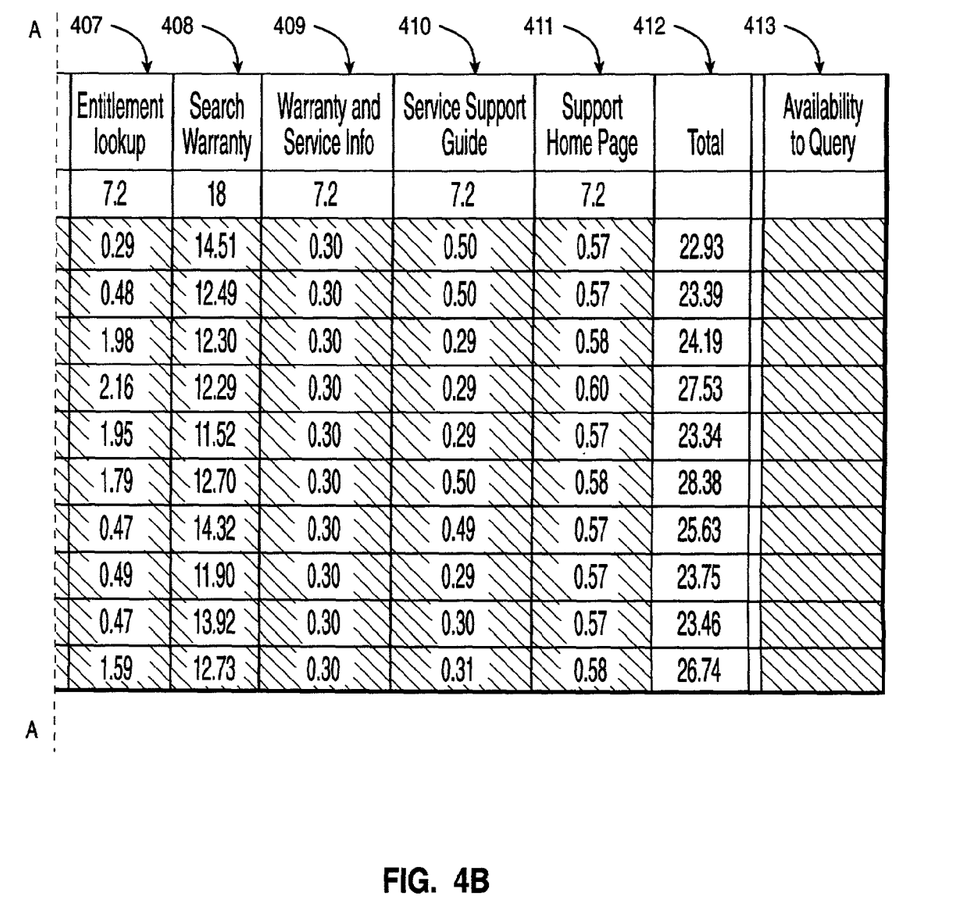

FIG. 4A and FIG. 4B illustrate an example of a report that was generated with data from a local probe. This example may be considered by itself as an example involving one probe, or may be considered together with the example shown in FIG. 3A and FIG. 3B. The data was produced by probing the web site that was described above regarding FIG. 3A and FIG. 3B. The script also is described above. Again, similar reports could be produced in connection with probing other kinds of web sites, or probing other kinds of client-server applications.

To begin with an overview, the broken line AA shows where the report is divided into two sheets. This example comprised: receiving data from a probe; comparing said data with threshold values (row 422) derived from a service level agreement; and reporting results of said comparing. Columns 403-412 display response time data in seconds. Each of the columns 403-411 represent a transaction step in a script. Column 412 represents the total of the response times for all the transaction steps. A description of the transaction step is shown in the column heading in row 421. Column 413 displays availability information, using a color code. In one example, the cell in column 413 was green if all the transaction steps were completed; otherwise the cell was red, representing a failed attempt to execute all the transaction steps. Thus column 413 may provide a measure of end-to-end availability from a probe location, since a business process could cross multiple applications deployed in multiple hosting centers. Column 402 shows probe location. Column 401 shows time of script execution. Each row from row 423 downward represents one iteration of the script; each of these rows represents how one end user's execution of a business process would be handled by the web site. Cells with a special color display service level agreement violations (not shown in this example). A report may contain error messages (not shown in this example).

Turning to some details of FIG. 4A and FIG. 4B, this example involves comparing data with threshold values derived from a service level agreement. To report the results of this comparing, color is used in this example. Row 422 shows threshold values. In each column, response times for a transaction step are compared with a corresponding threshold value. For example, column 403 is for the "open URL" step. For that step, column 403 reports results of each script execution.

The reporting comprised: reporting a subset (report shown in FIG. 4A and FIG. 4B) of the data that originated from a local probe; reporting a subset (report shown in FIG. 3A and FIG. 3B) of the data that originated from remote probes; and employing a similar reporting format for both subsets. Thus comparison of data from a local probe and data from remote probes was facilitated.

Regarding threshold values, note that an alternative example might involve threshold values that differed between the local and remote reports. Threshold values may need to be adjusted to account for Internet-related delays. Also note that FIG. 4A and FIG. 4B illustrate an example where hypertext markup language (HTML) was used to create the report, but another language such as extensible markup language (XML) could be used.

Figure 5A:
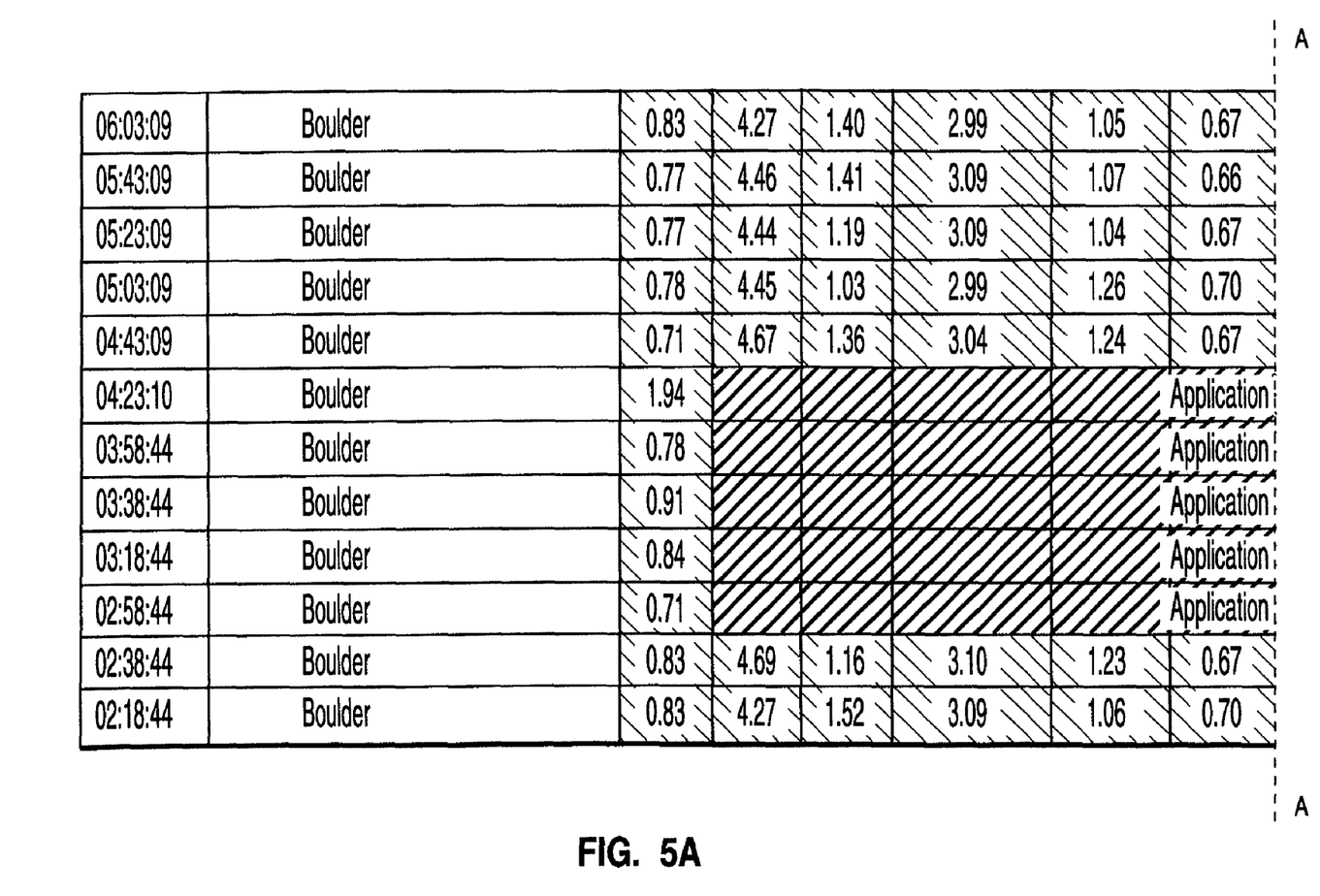
FIG. 5A and FIG. 5B illustrate an example of a report that was generated with data from a local probe, with error messages.
Figure 5B:
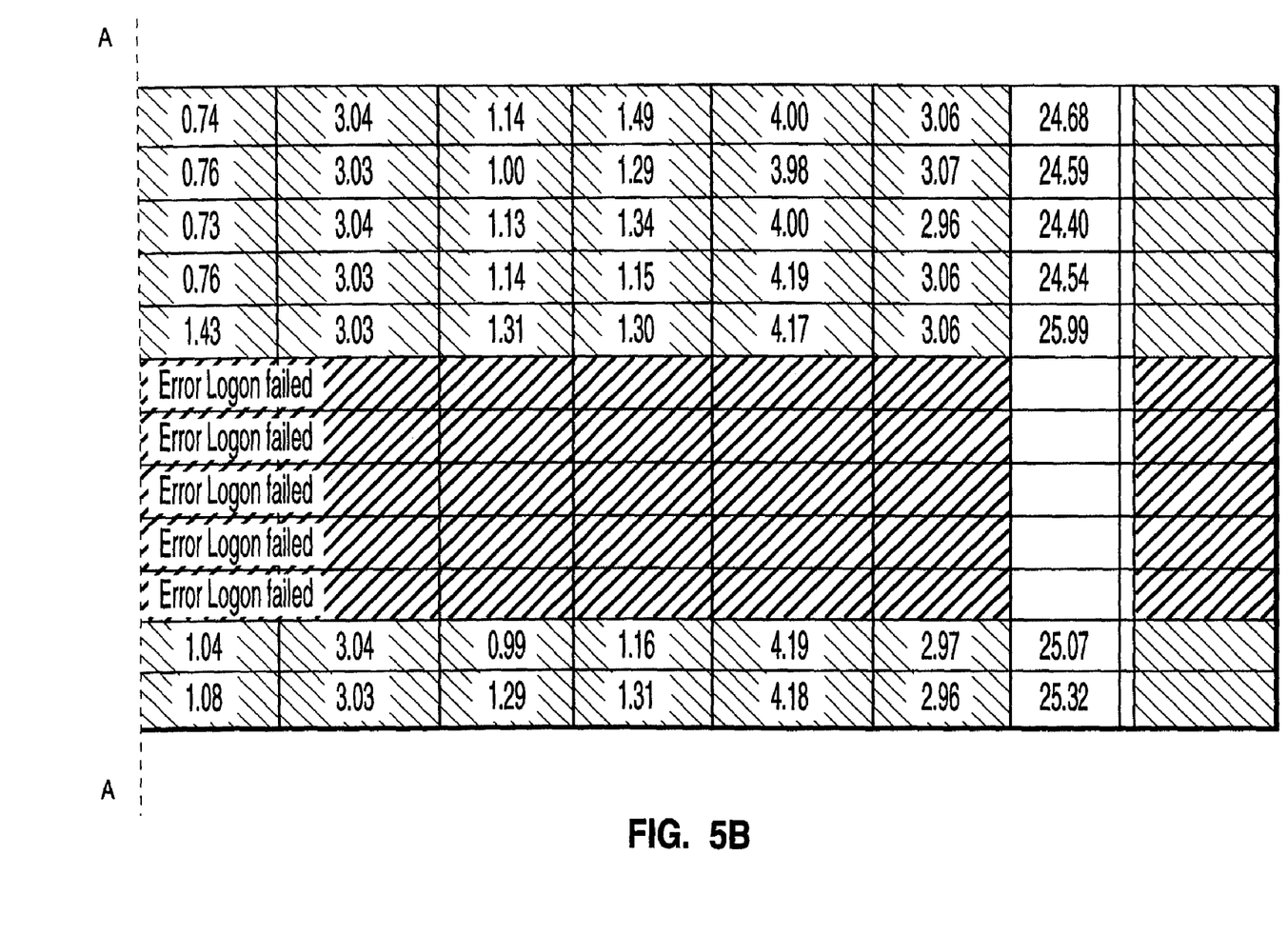

FIG. 5A and FIG. 5B illustrate an example of a report that was generated with data from a local probe, with error messages. This example may be considered by itself as an example involving one probe, or may be considered together with the examples shown in FIG. 3A, FIG. 3B, FIG. 4A, and FIG. 4B. The data was produced by probing a web site. The script was similar to the script described above. Again, similar reports could be produced in connection with probing other web sites, or probing other kinds of client-server applications. Again, the broken line AA shows where the report is divided into two sheets. The column on the far left shows time of script execution. The column on the far right displays availability information, using a color code. In this example, reporting comprised outputting in a special mode an indication of an application's lack of availability. Outputting in a special mode may mean outputting in a special color, for example, or outputting with some other visual cue such as highlighting or a special symbol. A special color is shown by darker shading, seen in the middle rows (with execution times from 02:58:44 to 04:23:10) for example. In one implementation, the special color was red, and other cells were in green.

FIGS. 5A and 5B also provide an example of receiving data from at least one probe; comparing said data with at least one threshold value derived from a service level agreement; and outputting in a special mode any measured response time value that is greater than the corresponding threshold value. Here, a special mode was a special color, shown by the darker shading seen in the middle rows (with execution times from 02:58:44 to 04:23:10) for example. The affected rows also contain an error message to guide problem-solving efforts: "Application Error: Logon Failed." In this example, hypertext markup language (HTML) was used to create the report, but another language such as extensible markup language (XML) could be used.

Note that the examples shown in FIGS. 3A, 3B, 4A, 4B, 5A, and 5B involved reporting results of each script execution by a probe. These are examples of comprehensive reporting, rather than displaying summaries or averages. Reporting results of each script execution allows immediate recognition of problems, and provides guidance for immediate problem-solving efforts.

To continue with this example in FIGS. 5A and 5B, involving error messages, reporting may comprise providing an alert when the data indicates an error. The alert may be provided via email, for example, or may be provided in real time via a network and a system management computer. A clearing message may be provided when the error no longer is detected. In the example shown in FIG. 2, local probe 221 generated a real time alert (problem event), and sent it to a TIVOLI management system (shown as console 205). Another similar kind of management system could be used.

The local probe automatically sent events to the management console used by the operations department. In the example solution, integration was provided with the TIVOLI MANAGEMENT ENVIRONMENT and the TIVOLI EVENT CONSOLE product. The example solution generated events from the local probe, and the events were generated after two consecutive errors on the same step in the business process. This could then be adjusted to send an event on the first error, for even faster notification. The recommendation is to send events on the second occurrence initially and then adjust to sending the event on the first occurrence as the environment becomes more stable and better understood by the operational staff. The reason for the recommendation is that in a Web environment there are a number of things that can cause intermittent problems, and it is ultimately a business decision when to invoke problem determination procedures. The report example in FIGS. 5A and 5B shows an example of a condition where an event was generated. There were five consecutive executions failing on step two. The event was generated starting at 02:58:44 and contained information about the failed business process.

The associated event sent to the TIVOLI ENTERPRISE CONSOLE had a severity of "Warning," and documented the failure of step two where the probe was unable to log on to the web site. Note that the date and time is the local time from the probe and that the reports could be generated using different time zones, such as GMT or as in this case British Summer Time. In the examples below, "CRT" refers to a type of probe technology used by IBM. An example of an alert follows.

Tivoli alert for CRT probe failure:
Tivoli CRT Alert—PC NA
WARNING (NAQS2 [LogonFailed/1])
PCNa—Partner Commerce North America CRT Monitor
tag:auth=crtGwaFw
tag:message=PartnerCommerceNA https://ecna.partner.com
Step-NAQS2-failed: Logon failed.
tag:severity=WARNING
tag:slot hostname=d03bpec18.pinfo.com
tag:slot mail_svr=CVRM
tag:slot mta=ecna.partner.com
tag:slot probe_addr=NAQS2
tag:slot probe_date=07/21
tag:slot probe_time=19:58
tag:class=crt_event
tag:source=SENTRY The error messages displayed in the report should be customized, interpret browser level messages, and be meaningful to the operational staff, to shorten problem determination time.

It is useful to automatically close opened events if a subsequent business process is executed successfully. This allows the operational staff to direct time and efforts to those events that remain in "open" status. Below is an example of such an event which was used to automatically close the previously opened event. The event was reported as severity HARMLESS and with the appropriate rules defined on the TIVOLI ENTERPRISE CONSOLE the previously opened event would be closed. Referring back to the report example in FIGS. 5A and 5B, this HARMLESS event was generated when the probe successfully executed the script starting at 4:43:09 and was able to log on to the site. An example of such an event follows.

Tivoli alert for CRT probe failure:
Tivoli CRT Alert—PC NA
HARMLESS (NAQS2 [Recoveredzf/0])
PCNa—Partner Commerce North America CRT Monitor
tag:auth=crtGwaFw
tag:message=PartnerCommerceNA
https://ecna.partner.com Step-NAQS2-failed: The problem causing the previous alert has been fixed.
tag:severity=HARMLESS
tag:slot hostname=d03bpec18.pinfo.com
tag:slot mail_svr=CVRM
tag:slot mta=ecna.partner.com
tag:slot probe_addr=NAQS2
tag:slot probe_date=07/21
tag:slot probe_time=21:43
tag:class=crt_event
tag:source=SENTRY In conclusion, we have shown examples of methods and systems for performance reporting in a network environment.

One of the preferred implementations of the invention is an application, namely a set of instructions (program code) in a code module which may, for example, be resident in the random access memory of a computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer-usable medium having computer-executable instructions for use in a computer. In addition, although the various methods described are conveniently implemented in a general-purpose computer selectively activated or reconfigured by software, one of ordinary skill in the art would also recognize that such methods may be carried out in hardware, in firmware, or in more specialized apparatus constructed to perform the required method steps.

While the invention has been shown and described with reference to particular embodiments thereof, it will be understood by those skilled in the art that the foregoing and other changes in form and detail may be made therein without departing from the spirit and scope of the invention. The appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the appended claims may contain the introductory phrases "at least one" or "one or more" to introduce claim elements. However, the use of such phrases should not be construed to imply that the introduction of a claim element by indefinite articles such as "a" or "an" limits any particular claim containing such introduced claim element to inventions containing only one such element, even when the same claim includes the introductory phrases "at least one" or "one or more" and indefinite articles such as "a" or "an;" the same holds true for the use in the claims of definite articles.

We claim:

1. A method for communicating performance information, said method comprising:
configuring a plurality of probes to execute a script for performing a transaction between a client computing device and a server computing device, wherein the script comprises a plurality of transaction steps for performing the transaction, and wherein the transaction is a sequence of the plurality of transaction steps;
collecting data, for the plurality of transaction steps, from the plurality of probes, including at least one local probe deployed at the server computing device and at least one remote probe deployed at the client computing device, wherein the collected data for each transaction step is data that is a measurement of a performance of the transaction step of the script executed by at least one probe of the plurality of probes; and
reporting said data, wherein reporting said data comprises:

generating a first report that comprises a plurality of transaction step entries, one entry for each transaction step of the script, and wherein each entry has associated performance data collected, for a corresponding transaction step, by the at least one local probe; and generating a second report that comprises a plurality of transaction step Entries, one entry for each transaction step of the script, and wherein each entry has associated performance data collected, for a corresponding transaction step, by the at least one remote probe;

comparing data reported in the first report to data reported in the second report, wherein the first report and the second report are of same report format to facilitate the comparing; and identifying a contribution of at least one network to performance of the transaction steps of the script based on the comparing.

2. The method of claim 1, wherein said reporting further comprises outputting a plurality of items chosen from two or more of:

response time data;
availability data;
probe location;
Internet service provider information;
time of script execution;
threshold values;
service level agreement violations; and
error messages.

3. The method of claim 1:
further comprising comparing said data with at least one threshold value derived from a service level agreement; and
wherein said reporting further comprises reporting results of said comparing.

4. The method of claim 1, further comprising providing an alert in response to said data indicating an error.

5. The method of claim 4, wherein said error is a measured response time value greater than a corresponding threshold value.

6. The method of claim 4, wherein said alert is provided via a system management computer.

7. The method of claim 4, further comprising providing a clearing message in response to said error no longer being detected.

8. The method of claim 1, wherein said reporting further comprises outputting in a special mode any measured response time value that is greater than the corresponding threshold value.

9. The method of claim 8, wherein said outputting in a special mode further comprises outputting in a special color.

10. The method of claim 1, wherein said reporting further comprises outputting in a special mode an indication of an application's lack of availability.

11. The method of claim 10, wherein said outputting in a special mode further comprises outputting in a special color.

12. The method of claim 1, wherein said reporting further comprises reporting results of each execution of the script by said plurality of probes.

13. A method for communicating performance information, said method comprising:
configuring at least one probe to execute a script for performing a transaction between a client computing device and a server computing device, wherein the script comprises a plurality of transaction steps for performing the transaction, and wherein the transaction is a sequence of the plurality of transaction steps;

receiving data, for the plurality of transaction steps, from the at least one probe, wherein the received data for each transaction step is data that is a measurement of a performance of the transaction step of the script executed by the at least one probe;

comparing said data with at least one threshold value derived from a service level agreement; and reporting results of said comparing, wherein the reported results comprise a plurality of transaction step entries, one entry for each transaction step of the script, and wherein each entry has associated performance data collected, for a corresponding transaction step, from the at least one probe, wherein said receiving, said comparing, and said reporting are performed for a plurality of probes, including at least one local probe deployed at the server computing device and at least one remote probe deployed at the client computing device, and wherein the method further comprises:

generating a first report that comprises a plurality of transaction step entries, one entry for each transaction step of the script, and wherein each entry has associated performance data collected, for a corresponding transaction step, by the at least one local probe; and generating a second report that comprises a plurality of transaction step entries, one entry for each transaction step of the script, and wherein each entry has associated performance data collected, for a corresponding transaction step, by the at least one remote probe;

comparing data reported in the first report to data reported in the second report, wherein the first report and the second report are of a same report format to facilitate the comparing; and identifying a contribution of at least one network to performance of the transaction steps of the script based on the comparing.

14. The method of claim 13, further comprising providing an alert in response to said data indicating an error.

15. The method of claim 14, wherein said error is a measured response time value greater than the corresponding threshold value.

16. The method of claim 14, wherein said alert is provided via a system management computer.

17. The method of claim 14, further comprising providing a clearing message in response to said error no longer being detected.

18. The method of claim 13, wherein said reporting further comprises outputting in a special mode any measured response time value that is greater than the corresponding threshold value.

19. The method of claim 18, wherein said outputting in a special mode further comprises outputting in a special color.

20. A method for communicating performance information, said method comprising:
configuring a plurality of probes to execute a script for performing a transaction between a client computing device and a server computing device, wherein the script comprises a plurality of transaction steps for performing the transaction, and wherein the transaction is a sequence of the plurality of transaction steps;

receiving data, for the plurality of transaction steps, from at least one probe, wherein the received data for each data transaction step is data that is a measurement of a performance of the transaction step of the script executed by the plurality of probes;

comparing said received data with at least one threshold value derived from a service level agreement;

reporting said received data, wherein reporting said received data comprises generating a report that comprises a plurality of transaction step entries, one entry for each transaction step of the script, and wherein each entry has associated performance data collected, for a corresponding transaction step, from one or more of the at least one local probe or the at least one remote probe; and outputting in a special mode any measured response time value that is greater than the corresponding threshold value, wherein said receiving, said comparing, said reporting, and said outputting are performed for a plurality of probes, including at least one local probe deployed at the server computing device and at least one remote probe deployed at the client computing device, and wherein the method further comprises:

generating a first report that comprises a plurality of transaction step entries, one entry for each transaction step of the script, and wherein each entry has associated performance data collected, for a corresponding transaction step, by the at least one local probe; and generating a second report that comprises a plurality of transaction step entries, one entry for each transaction step of the script, and wherein each entry has associated performance data collected, for a corresponding transaction step, by the at least one remote probe;

comparing data reported in he first report to data reported in the second report, wherein the first report and the second report are of a same report format to facilitate the comparing; and identifying a contribution of at least one network to performance of the transaction steps of the script based on the comparing.

21. The method of claim 20, wherein said outputting in a special mode further comprises outputting in a special color.

22. A system for communicating performance information, said system comprising:

a plurality of probe computers configured to execute a script for performing a transaction between a client computing device and a server computing device, wherein the script comprises a plurality of transaction steps for performing the transaction, and wherein the transaction is a sequence of the plurality of transaction steps;

one or more database storage devices that collect data, for the plurality of transaction steps, from the plurality of probes, including at least one local probe deployed at the server computing device and at least one remote probe deployed at the client computing device, and wherein the data collected for each transaction step is a measurement of a performance of the transaction step of the script executed by the plurality of probes; and a report generator that reports said data, wherein reporting said data comprises:

generating a first report that comprises a plurality of transaction step entries, one entry for each transaction step of the script, and wherein each entry has associated performance data collected, for a corresponding transaction step, from the at least one local probe; and generating a second report that comprises a plurality of transaction step entries, one entry for each transaction step of the script, and wherein each entry has associated performance data collected, for a corresponding transaction step, by the at least one remote probe;

comparing data reported in the first report to data reported in the second report, wherein the first report and the second report are of a same report format to facilitate the comparing; and identifying a contribution of at least one network to performance of the transaction steps of the script based on the comparing.

23. The system of claim 22, wherein the report generator outputs a plurality of items chosen from two or more of:
response time data;
availability data;
probe location;
Internet service provider information;
time of script execution;
threshold values;
service level agreement violations; and
error messages.

24. The system of claim 22, wherein the report generator compares said data with at least one threshold value derived from a service level agreement and reports results of said comparing.

25. The system of claim 22, wherein the report generator provides an alert when in response to said data indicating an error.

26. The system of claim 25, wherein said error is a measured response time value greater than a corresponding threshold value.

27. The system of claim 25, wherein said alert is provided via a system management computer.

28. The system of claim 25, wherein the probes provide a clearing message in response to said error no longer being detected.

29. The system of claim 22, wherein the report generator outputs, in a special mode, any measured response time value that is greater than a corresponding threshold value.

30. The system of claim 29, wherein the report generator outputs in a special mode by outputting in a special color.

31. The system of claim 22, wherein the report generator outputs in a special mode an indication of an application's lack of availability.

32. The system of claim 31, wherein the report generator outputs in a special mode by outputting in a special color.

33. The system of claim 22, wherein the report generator reports results of each execution of the script by said plurality of probes.

34. An apparatus for communicating performance information, the apparatus comprising:

a computer usable medium;

first program instructions to configure a plurality of probes to execute a script for performing a transaction between a client computing device and a server computing device. wherein the script comprises a plurality of transaction steps for performing the transaction, and wherein the transaction is a sequence of the plurality of transaction steps;

second program instructions to collect data, for the plurality of transaction steps, from the plurality of probes, including at least one local probe deployed at the server computing device and at least one remote probe deployed at the client computing device, wherein the data collected for each transaction step is a measurement of a performance of the transaction step of the script executed by at least one probe of the plurality of probes; and third program instructions to report said data, wherein reporting said data comprises:

generating a first report that comprises a plurality of transaction step entries, one entry for each transaction step of the script, and wherein each entry has associated performance data collected, for a corresponding transaction step, by the at least one local probe; and generating a second report that comprises a plurality of transaction step entries, one entry for each transaction step of the script, and wherein each entry has associated performance data collected, for a corresponding transaction step, by the at least one remote probe;

comparing data reported in the first report to data reported in the second report, wherein the first report and the second report are of a same report format to facilitate the comparing; and identifying a contribution of at least one network to performance of the transaction steps of the script based on the comparing, wherein the first, second, and third program instructions are stored on the computer usable medium.

35. The apparatus of claim 34, further comprising fourth program instructions to output a plurality of items chosen from:
response time data;
availability data;
probe location;
Internet service provider information;
time of script execution;
threshold values;
service level agreement violations; and
error messages, wherein the fourth program instructions are stored on the computer usable medium.

36. The apparatus of claim 34, further comprising:
fourth program instructions to compare said data with at least one threshold value derived from a service level agreement and fifth program instructions to report results of comparing said data with said at least one threshold value, wherein the fourth and fifth program instructions are stored on the computer usable medium.

37. The apparatus of claim 34, further comprising fourth program instructions to provide an alert in response to said data indicating an error, wherein the fourth program instructions are stored on the computer usable medium.

38. The apparatus of claim 37, wherein said error is a measured response time value greater than a corresponding threshold value.

39. The apparatus of claim 37, wherein said alert is provided via a system management computer.

40. The apparatus of claim 37, further comprising fifth program instructions to provide a clearing message in response to said error no longer is being detected, wherein the fifth program instructions are stored on the computer usable medium.

41. The apparatus of claim 34, further comprising fourth program instructions to output in a special mode any measured response time value that is greater than a corresponding threshold value, wherein the fourth program instructions are stored on the computer usable medium.

42. The apparatus of claim 41, further comprising fifth program instructions to output in a special mode by outputting in a special color, wherein the fifth program instructions are stored on the computer usable medium.

43. The apparatus of claim 34, further comprising fourth program instructions to output in a special mode an indication of an application's lack of availability, wherein the fourth program instructions are stored on the computer usable medium.

44. The apparatus of claim 43, further comprising fifth program instructions to output in a special mode by outputting in a special color, wherein the fifth program instructions are stored on the computer usable medium.

45. The apparatus of claim 34, further comprising fourth program instructions to report results of each execution of the script by said plurality of probes, wherein the fourth program instructions are stored on the computer usable medium.

46. The method of claim 12, further comprising:
formatting the first report and the second report to comprise a table having at least one row for each execution of the script and columns ordered according to an order of the transaction steps in the script; and
outputting the first report and second report to a user.

47. The method of claim 13, further comprising:
formatting the first report and the second report to comprise a table having at least one row for each execution of the script and columns ordered according to an order of the transaction steps in the script: and
outputting the first report and second report to a user.

48. The method of claim 20, further comprising:
formatting the first report and the second report to comprise a table having at least one row for each execution of the script and columns ordered according to an order of the transaction steps in the script; and
outputting the first report and the second report to a user.

49. The system of claim 33, further comprising:
means for formatting the first report and the second report to comprise a table having at least one row for each execution of the script and columns ordered according to an order of the transaction steps in the script; and
means for outputting the first report and second report to a user.

50. The apparatus of claim 45, further comprising fifth program instructions to format the first report and the second report to comprise a table having at least one row for each execution of the script and columns ordered according to an order of the transaction steps in the script; and
sixth program instructions output the first report and the second report to a user, and wherein the fifth and sixth program instructions are stored on the computer medium.

* * * * *